Figure 1:
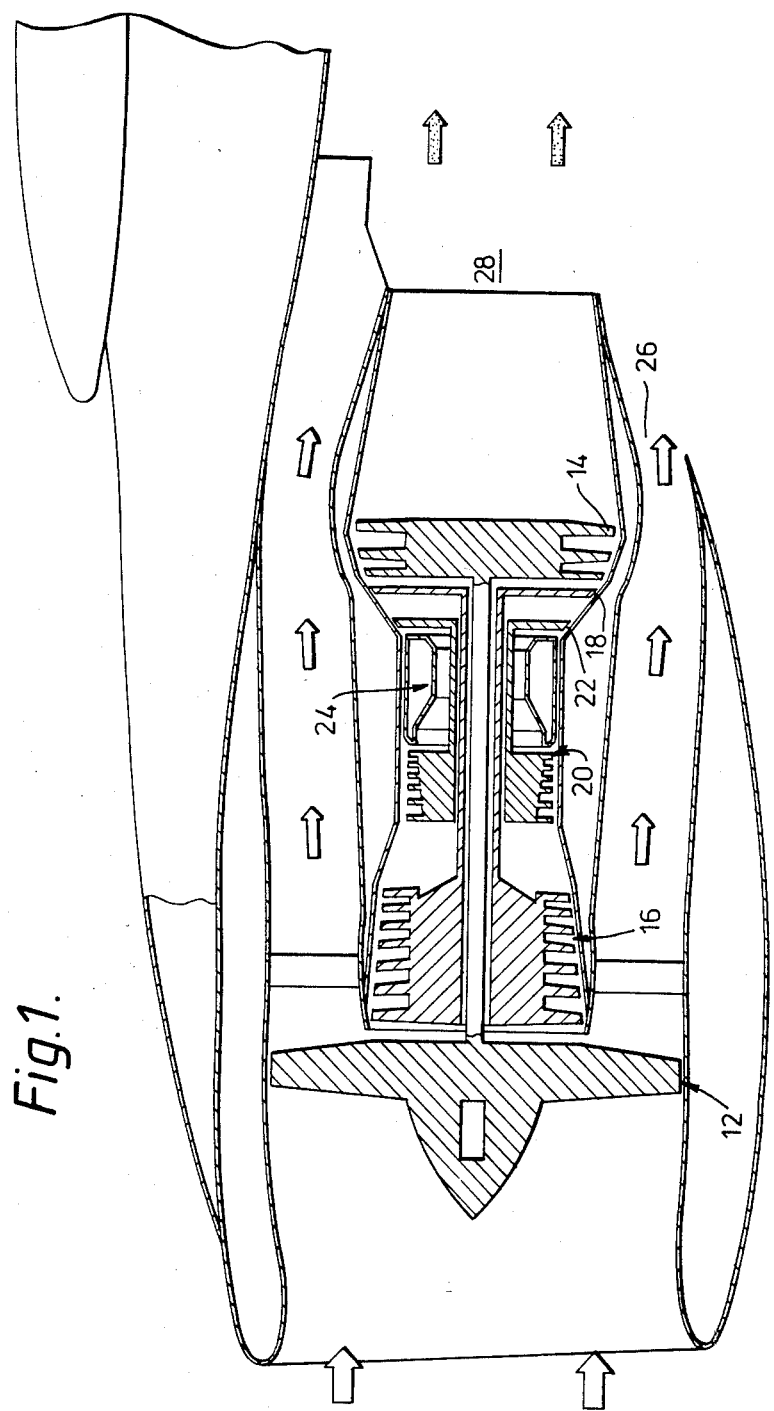

United States Patent [19]

Kwan et al.

[11] Patent Number: 4,561,257
[45] Date of Patent: Dec. 31, 1985

[54] GAS TURBINE ENGINE COMBUSTION APPARATUS

[75] Inventors: William C. T. Kwan, Alvaston; Anthony Pidcock, Shelton Lock, both of England

[73] Assignee: Rolls-Royce Limited, London, England

[21] Appl. No.: 634,453

[22] Filed: Jul. 26, 1984

Related U.S. Application Data

[63] Continuation-in-part of Ser. No. 373,781, Apr. 30, 1982, abandoned.

[30] Foreign Application Priority Data

May 20, 1981 [GB] United Kingdom ............... 8115438

[51] Int. Cl.[4] ............................................. F23R 3/20
[52] U.S. Cl. .......................................... 60/737; 60/756
[58] Field of Search ................. 60/736, 737, 738, 755, 60/756, 757, 758, 759

[56] References Cited

U.S. PATENT DOCUMENTS 2,552,851  5/1951  Gist ....................................... 60/738
4,138,842  2/1979  Zwick .................................... 60/737

FOREIGN PATENT DOCUMENTS

| 619353 | 3/1949 | United Kingdom . |
| 627644 | 8/1949 | United Kingdom . |
| 798474 | 7/1958 | United Kingdom . |
| 1273017 | 5/1972 | United Kingdom . |
| 856437 | 12/1972 | United Kingdom . |
| 1427146 | 3/1976 | United Kingdom . |
| 2040434 | 8/1980 | United Kingdom . |

Primary Examiner—Louis J. Casaregola
Assistant Examiner—Timothy S. Thorpe
Attorney, Agent, or Firm—Cushman, Darby & Cushman

[57] ABSTRACT

A gas turbine engine combustion apparatus for vaporizing fuel comprises a flame tube having an upstream end wall in which are located a number of flow guides having associated fuel ducts. In operation, fuel and air flow through the U-shaped duct in each guide and the fuel flows onto the inside of the end wall which acts as a vaporizing surface. The exterior of the end wall is cooled by a flow of air from the engine compressor. The invention avoids the need of vaporizing tubes within the flame tube.

12 Claims, 10 Drawing Figures

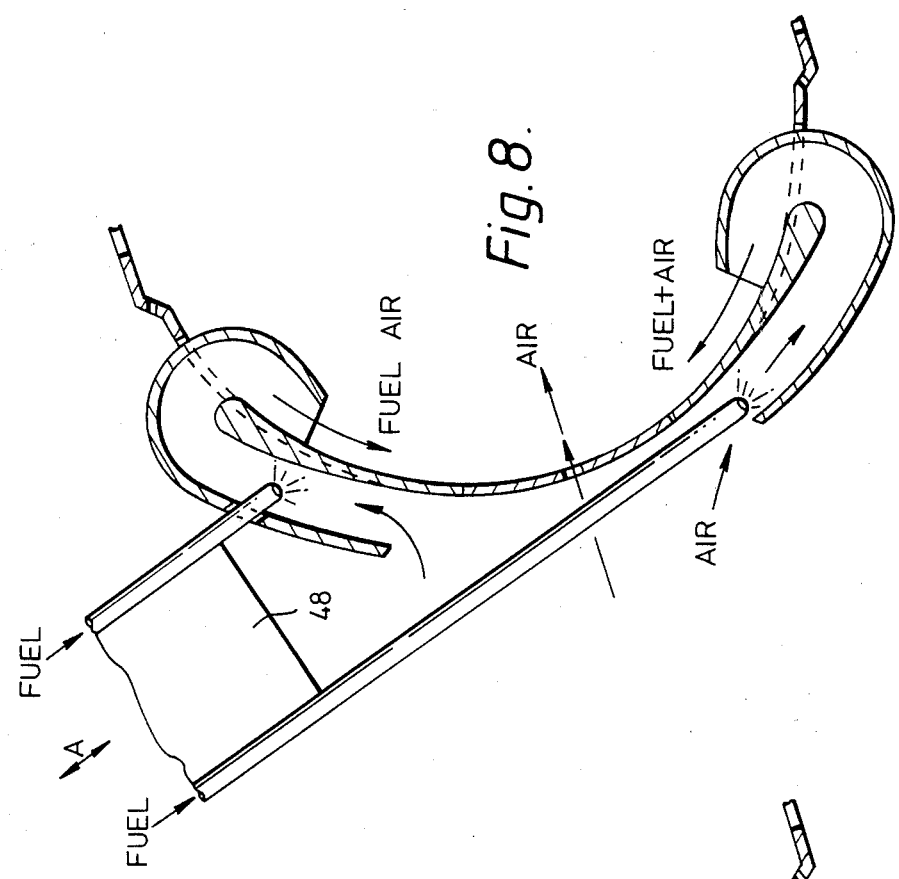
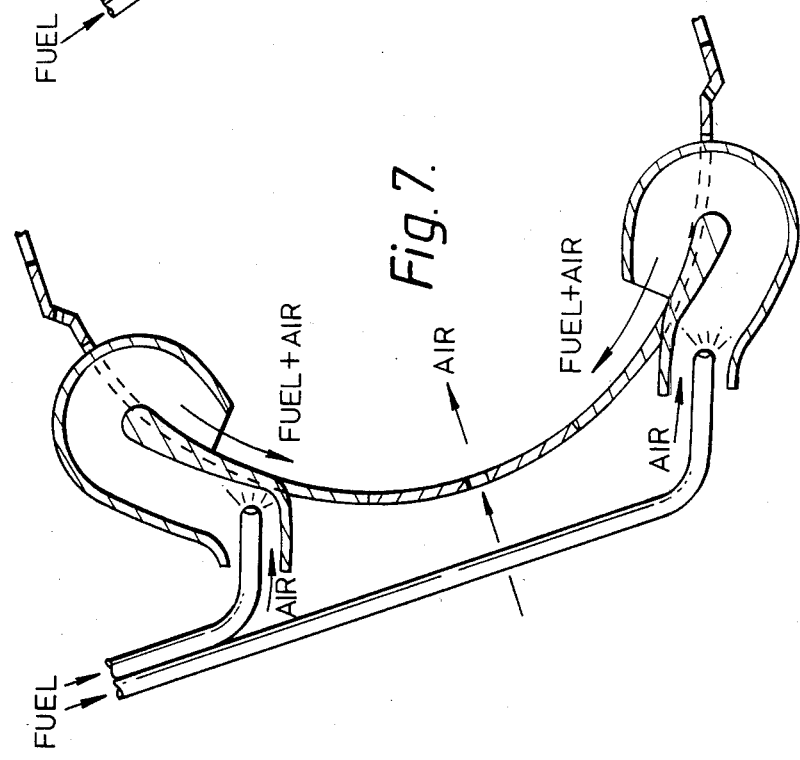

GAS TURBINE ENGINE COMBUSTION APPARATUS

This application is a continuation-in-part of our U.S. application Ser. No. 373,781, filed Apr. 30, 1982, now abandoned.

This invention relates to combustion apparatus and fuel injectors for use in gas turbine engines.

There are two principal methods of injecting fuel into the combustion chamber of a gas turbine engine, firstly a method in which the fuel at a relatively low pressure is atomised by a high velocity flow of air in an airspray or airblast injector, or the fuel, at a relatively high pressure, is atomised by being forced through a nozzle, and secondly a method in which the fuel is injected into a tube or tubes located in the primary zone of the combustion zone, so that the fuel is at least partially vaporised on the hot surface of the tube or tubes. The present invention is concerned with the latter method.

The known forms of vaporising tubes include L-shaped, T-shaped and hockey stick-shaped tubes which are prone to being burnt-out and can interfere with the gas flow in the combustion chamber. The present invention seeks to provide a vaporising type fuel injector in which fuel is directed to a vaporising surface by a number of guides located on the upstream wall of the combustion chamber, the vaporising surface comprising part of the upstream wall of the combustion chamber. In this way, the use of vaporising tubes in the primary zone can be avoided and the exterior of the vaporising wall can be cooled by a flow of air from the engine compressor.

It is also known from the patent to Gist U.S. Pat. No. 2,552,851, for an annular combustion chamber to be provided with an annular inner and an annular outer U shaped channel section, both of which are mounted within a frontal annular entry way. Further these channels have a short annular side which is secured to the combustion chamber wall and a relatively long side which extends into the combustion chamber. The channels form annular preheating passages, and annular fuel manifolds are positioned within the combustion chamber and supply fuel through nozzles into each preheating passages so that the fuel goes into the second limb of the preheating passages and is vaporised on the long channel sides due to heat generated from the combustion process. The fuel is swept along the annular passages by the air flow and mixes with the air before flowing into the combustion zone. The fuel manifolds require large numbers of circumferentially arranged nozzles to provide a uniform fuel/air ratio around the annular passages.

This arrangement has several disadvantages, firstly the channels and preheating passages are annular, this necessitates the use of very narrow passages in order to meter the required flow. Typical passage height would be 1.0 mm and this would result in manufacturing tolerance problems, and additionally the annular shape constrains differential expansion which would lead to distortion.

Secondly the annular fuel manifolds are of large volume and are positioned within the combustion chamber adjacent to hot metal surfaces, this can lead to fuel decomposition. Also the fuel nozzles must be very small to distribute the fuel evenly, and these are bound to block because of the fuel degradation. The fuel manifolds will be constrained in differential thermal expansion.

Thirdly, the mixing of fuel and air takes place in the annular passages downstream of the fuel manifold, the long sides of the annular channels are exposed to the hot combustion gases which could increase the mechanical hazards, i.e. burn outs. The second limb portion of the annular channel must be long to achieve mixing and to provide a large area for fuel vaporisation.

Fourthly, if the annular passage were not fueled, if some nozzles were blocked due to fuel degradation, a boundary of weak mixture would be formed leading to overheating of the annular channel sides due to loss of fuel cooling and thus causing flashback.

Accordingly, the present invention provides a gas turbine engine combustion apparatus comprising at least one flame tube defining a combustion chamber of a fuel vaporising type, said at least one flame tube including an upstream end wall having an exterior surface upon which compressed air is discharged to cool the same and an interior downstream surface upon which fuel is directly discharged and vaporised, said at least one flame tube having a primary combustion zone within the combustion chamber downstream of said downstream surface of said upstream wall; a plurality of flow guide ducts operatively associated with and extending through said upstream end wall of said at least one flame tube, said plurality of flow ducts being arranged in at least one circumferential row about said upstream end wall of said flame tube, each of said flow guide ducts including a first limb portion positioned on said exterior upstream surface of said upstream end wall and having an inlet for compressed air and a second limb portion positioned on said interior downstream surface of said upstream end wall and having an outlet immediately adjacent to said interior downstream surface of said upstream wall for directing a discrete flow of fluid therefrom directly onto said interior downstream surface, and fuel ducts positioned entirely on the exterior of said flame to be and associated with said first limb portion of at least some of said flow guide ducts for injecting fuel into the flow of compressed air therein to provide a fuel and air mixture, said first limb portion positioned on said exterior upstream surface of said upstream end wall being elongated relative to said second limb portion so as to enable fuel and air flowing therethrough to be substantially fully mixed before flowing into said second limb portion, said second limb portion having a short length extending a small amount into said flame tube so as to minimize area for vaporisation of the fuel and air mixture prior to discharge from the outlet of said second limb portion directly onto said interior downstreamm surface of said upstream end wall where the fuel is vaporised prior to burning in the primary combustion zone of said flame tube.

The guides may be casting which are set in the combustor end wall and have an internal flow channel which is substantially U-shaped in cross section.

All the flow guides can have associated fuel ducts or alternate guides only can have fuel ducts, or any other spacing of fuel ducts in relation to the pattern of flow guides can be used.

The invention can be applied to can type, canannular type or annular type combustion chambers.

Figure 2:
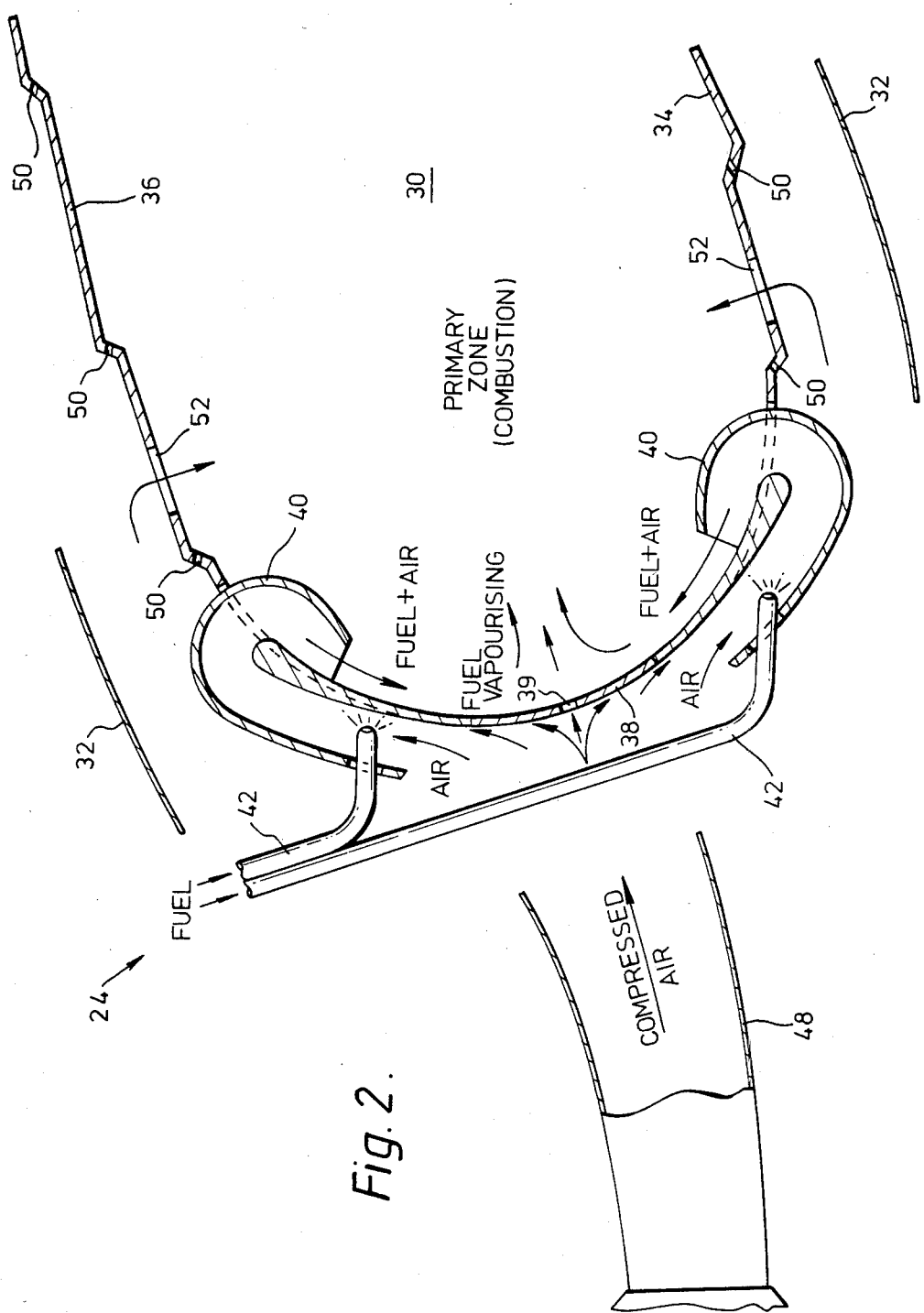
Figure 3:
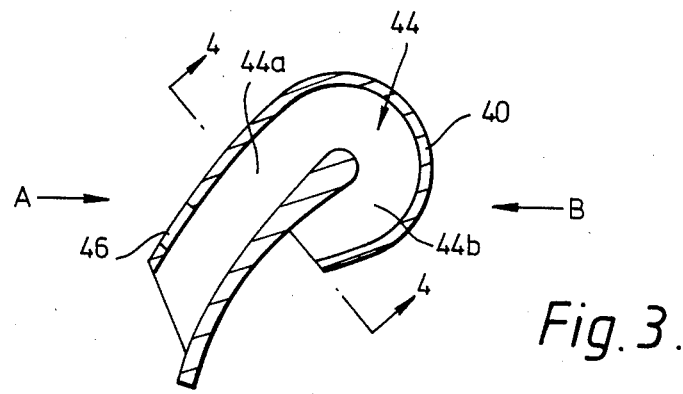
Figure 4:
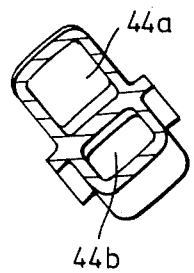
Figure 5:
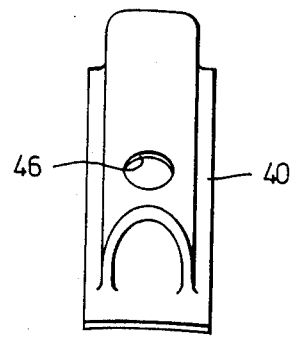
Figure 6:
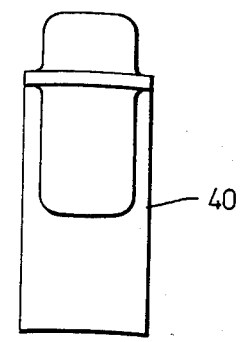

The invention will be more particularly described with reference to the accompanying drawings in which:

FIG. 1 shows a gas turbine engine incorporating one form of combustion apparatus according to the present invention, FIG. 2 shows a schematic view of part of the combustion apparatus of FIG. 1 to a larger scale, FIG. 3 is a view of one of the flow guides shown in FIG. 2, FIG. 4 is a section on line 4—4 in FIG. 3, FIG. 5 is a view on arrow 'A' in FIG. 3, FIG. 6 is a view on arrow 'B' in FIG. 3, and FIGS. 7 to 10 inclusive show modified forms of combustion apparatus to that shown in FIG. 2.

Referring to the Figures, a gas turbine engine 10 comprises a fan 12 driven by a turbine 14, an intermediate pressure compressor 16 driven by an intermediate pressure turbine 18, a high pressure compressor 20 driven by a high pressure turbine 22, and a combustion apparatus 24. The air propelled by the fan 12 is exhausted throuugh a propulsion nozzle 26 and the hot gases from the turbines 14, 18 and 22 are exhausted through a nozzle 28.

The combustion apparatus 24 comprises an annular flame tube 30 which is located in an annular casing 32, the flame tube 30 including inner and outer walls 34, 36 respectively and an upstream end wall 38.

The end wall 38 has two circumferential rows of equi-spaced flow guides 40, each flow guide having an associated fuel duct 42.

The flow guides, as seen more clearly in FIGS. 3 to 6, comprise a substantially U-shaped duct 44, one limb 44a of which is external of the flame tube and the other limb 44b is inside the flame tube. The wall of the outer limb 44a has an aperture 46 through which the fuel duct 42 projects.

The limb 44a of the flow guide which is external of the flame tube is elongated so that fuel and air can mix before entering the limb 44b which is internal of the flame tube. The limb 44b is relatively short in length so as to minimise the area available for fuel flowing therethrough to vapourise upon, and to minimise the area of material which can be burnt out. The ratio of the length of the external limb 44b to the length of the internal limb 44b is in the range of 2:1 to 3:1. The limb 44a has a passage height of 10–12 mm, and a width of 10–12 mm, the limb 44b has a passage height at the exit of 4–10 mm depending upon the particular flame tube, and a width of 10–12 mm. The limb 44b has a length in the range of 25–30 mm and limb 44a has a length in the range of 50–90 mm.

In operation, compressed air from the engine high pressure compressor 20 flows to the combustion apparatus 24 through a dump diffuser 48, and some of the compressed air flows into the flame tube through the ducts 44 in the flow guides 40. The remainder of the compressed air is used either as cooling air flowing over the exterior of the end wall 38, and flowing through openings 50 in the walls 34, 36 as further air for combustion and/or combustion quenching, e.g. flowing through openings 52, and as dilution air to cool the hot combustion gases to a temperature suitable for the high pressure turbine 22.

Fuel is injected through the fuel ducts 42 into the U-shaped duct 44 in the flow guides 40 and a fuel and air mixture flows into the flame tube and the fuel is directed onto the internal surface of the end wall 38. Combustion has already been initiated by an igniter (not shown) and the end wall 38 will be at a temperature sufficient for the fuel to vaporise on the wall 38. No burning takes place on the wall 38 and the vaporised fuel is burnt in the primary zone, and the wall 38 is cooled by a flow of air from the dump diffuser 48.

The upstream wall 38 can also be vented by a number of apertures 39 through which air flows. This venting flow can lift fuel off the inside surface of the wall 38 and assist in stabilising the flow pattern generated by the opposed flows of air through the inlets 52.

In FIG. 7, the inlets to each flow guide 40 have been aligned substantially with the incoming air flow. In FIG. 8, in order to improve the positioning of the fuel pipes 42, the pipes are both straight and are joined by an aerodynamic strut 48, and the lower fuel pipe injects fuel directly into the intake of the respective flow guide, while the upper fuel pipe passes through the aperture 46 in the respective flow guide. This arrangement allows both fuel pipes to be moved, into and out of position in the direction of the arrow A.

Figure 9:
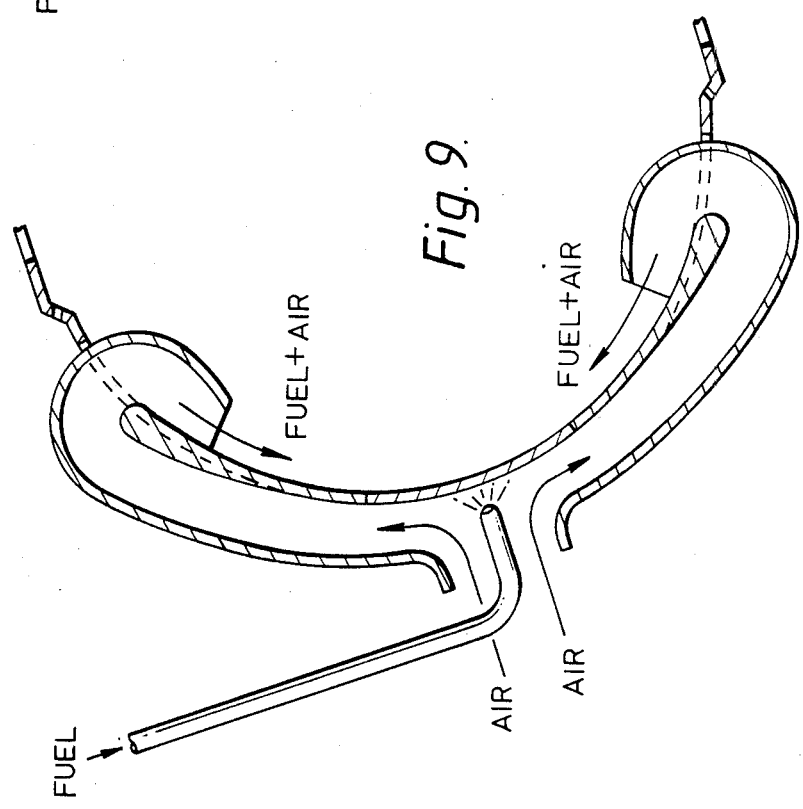

In FIG. 9, the inlets to the corresponding flow guides in both rows have been extended towards the centreline of the flame tube to form a single inlet for both flow guides and only one fuel pipe is needed for each pair of flow guides.

Figure 10:
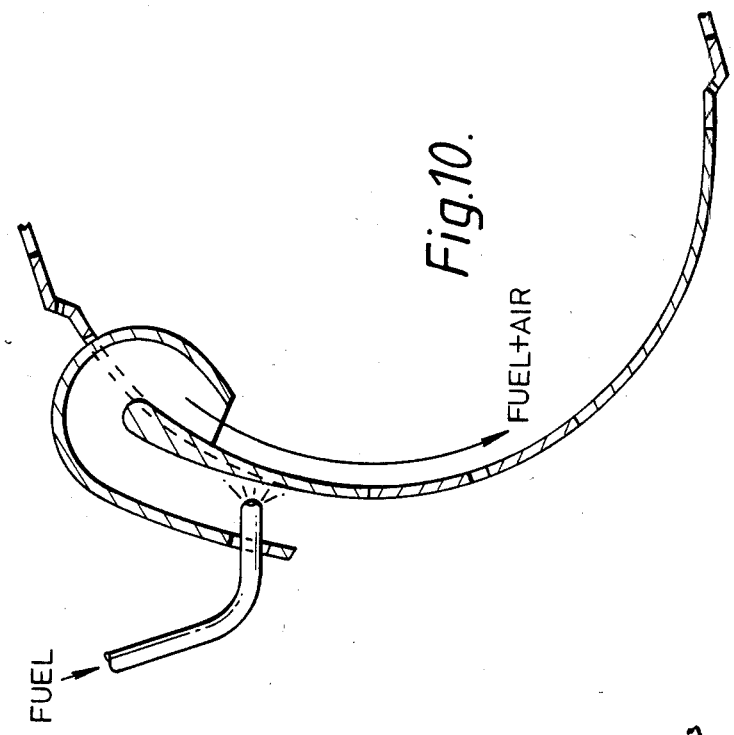

In FIG. 10, only one row of flow guides is provided, the row being located to one side of the flame tube, this arrangement being part of single-sided primary zone design.

It will be appreciated the end wall takes the place of the variously-shaped vaporising tubes and as the wall is adequately cooled, the danger of the wall burning-out is minimised. Also, the flow guides only extend into the flame tubes by a relatively small amount and are cooled by the throughflow of air.

Various modifications within the scope of the invention are possible. For example, means for swirling the air entering the flow guides can be provided, not all the flow guides need have fuel ducts, the flow guides in one row can be staggered with respect to the flow guides in the other row, and the flow guides can be arranged other than in two circumferential rows, particularly if the invention is applied to a cylindrical flame tube, in which case there need only be a single circumferential row of guides.

Only alternate flow guides can have associated fuel ducts and the flow guides which only receive air can have air swirling means, or the outer row of guides can all have associated fuel ducts whilst the inner row only receive air and have air swirling means.

Each flow guide is preferably a casting which is brazed into a suitably sized opening in the flame tube end wall.

The invention can be applied to annular, canannular or can types of gas turbine engine combustion apparatus.

The present invention overcomes all the problems of the Gist patent, firstly the individual flow guide ducts have a greater passage height and are relatively insensitive to manufacturing tolerances, and because they are individual are less prone to thermal distortion.

Secondly the fuel ducts for supplying fuel to the flow guide ducts are positioned externally of the flame tube away from the heat of combustion. Also there are much fewer nozzles which are therefore larger and less prone to blockage. The fuel ducts will not be constrained in differential expansion.

Thirdly because the fuel is injected from the fuel ducts into the upstream end of the first limb portion of the flow guide ducts, the majority of the mixing of the fuel and air takes place in the first limb of the flow guide duct externally of the flame tube by aerodynamic processes. This enables a minimum length of flow guide duct, second limb portion, within the flame tube to finalise mixing and direct the fuel/air mmixture onto the interior downstream surface of the upstream end wall, this also reduces the area for possible burn outs or vaporisation of fuel on the second limb portion.

Fourthly the use of separate flow guide ducts allows two important options which are not possible with the annular preheating passageway in Gist. One is that a staggered flow guide ducts arrangement is possible, to increase primary zone turbulence and mixing. The second is that some of the flow guide ducts need not be fueled if required.

Fifthly the fuel/air mixture is vaporised on the interior downstream surface of the upstream end wall not in the flow guide ducts.

We claim:

1. A gas turbine engine combustion apparatus comprising:

at least one flame tube defining a combustion chamber of a fuel vaporising type, said at least one flame tube including an upstream end wall having an exterior upstream surface upon which compressed air is discharged to cool the same and an interior downstream surface upon which fuel is directly discharged and vaporised, said at least one flame tube having a primary combustion zone within the combustion chamber downstream of said downstream surface of said upstream end wall;

a plurality of flow guide ducts operatively associated with and extending through said upstream end wall of said at least one flame tube, said plurality of flow ducts being arranged in at least one circumferential row about said upstream end wall of said frame tube, each of said flow guide ducts including a first limb portion positioned on said exterior upstream surface of said upstream end wall and having an inlet for compressed air and a second limb portion positioned on said interior downstream surface of said upstream end wall and having an outlet immediately adjacent to said interior downstream surface of said upstream wall for directing a discrete flow of fluid therefrom directly onto said interior downstream surface; and fuel ducts positioned entirely on the exterior of said flame tube and associated with said first limb portion of at least some of said flow guide ducts for injecting fuel into the flow of compressed air therein to provide a fuel and air mixture, each of said fuel ducts having orifice means positioned at the upstream end of the said associated first limb portion for injecting fuel into the flow guide ducts, said first limb portion positioned on said exterior upstream surface of said upstream end wall having an elongated length which coupled with positioning of said orifice means of said fuel ducts in the upstream end thereof sufficient to enable fuel and air flowing therethrough to be substantially fully mixed before flowing into said second limb portion, said second limb portion having a short length extending a small amount into said flame tube so as to minimize area for vaporisation of the fuel and air mixture prior to discharge from the outlet of said second limb portion directly onto said interior downstream surface of said stream end wall where the fuel is vaporised prior to burning in the primary combustion zone of said flame tube.

2. A combustion apparatus as claimed in claim 1 in which said flame tube is annular and said flow guide ducts are arranged in two circumferential rows, said guide ducts in each row being equi-spaced.

3. A combustion apparatus as claimed in claim 2 in which said flow guide ducts in one row are staggered with respect to said flow guide ducts in the other row.

4. A combustion apparatus as claimed in claim 2 in which said inlets of corresponding flow guide ducts in the two rows extend towards the centre-line of said flame tube to form a single intake for a respective pair of said flow guide ducts, a fuel duct being located to direct fuel into at least some of said single intakes.

5. A combustion apparatus as claimed in claim 2 in which said flame tube is annular and said flow guide ducts are arranged in two circumferential rows, said flow guide ducts in each row being equi-spaced, each of said flow guide ducts having an associated fuel duct.

6. A combustion apparatus as claimed in claim 2 in which only alternate ones of said flow guide ducts have an associated fuel duct.

7. A combustion apparatus as claimed in claim 2 in which only one row of said flow guide ducts have associated fuel ducts.

8. A combustion apparatus as claimed in claim 1 in which said flame tube is cylindrical and said flow guides are arranged in at least one circumferential row on said upstream end wall of the combustion chamber.

9. A combustion apparatus as claimed in claim 8 in which only alternate ones of said flow guide ducts have associated fuel ducts.

10. A combustion apparatus as claimed in claim 1 in which said flame tube has venting means in said upstream end wall at or adjacent a center of the same to allow air to enter the combustion chamber of said flame tube and strip vaporised fuel therefrom.

11. A combustion apparatus as claimed in claim 1 in which each of said flow guide ducts comprises a substantially U-shaped duct.

12. A combustion apparatus as claimed in claim 11 in which each of said flow guide ducts has said inlet thereof aligned substantially with the incoming air flow.

* * * * *